March 31, 1964 K. WAHL 3,127,456
PROCESS FOR MAKING FILM BASES
Filed March 7, 1962
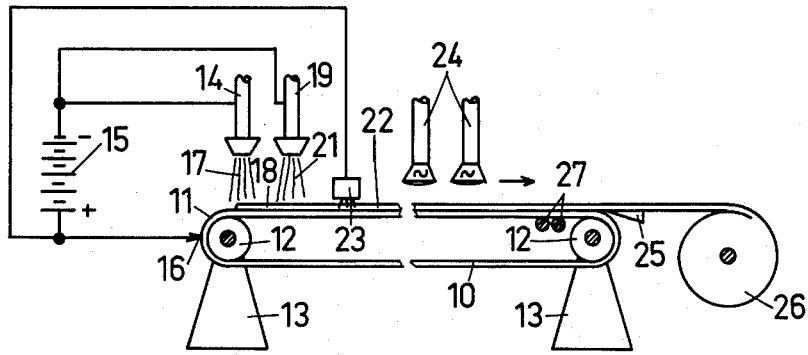
Karl WAHL
INVENTOR.
BY Karl J. Ross
AGENT 3,127,456
PROCESS FOR MAKING FILM BASES
Karl Wahl, Landhaus Neugut, Schaan, Liechtenstein
Filed Mar. 7, 1962, Ser. No. 178,787
14 Claims. (Cl. 264—24)

My present invention relates to a process for making film bases and similar foils for use as emulsion-support in photography or as magnetizable-particle carriers for sound recording and the like.

Film bases and similar foils for use in photographic film and magnetic sound-recording tapes have generally been produced heretofore from film-forming cellulosic substances, i.e. acetylcellulose, nitrocellulose and the like, and, more recently, from synthetic resins such as polyethylene. Since the mechanical devices (e.g. motion- and still-picture cameras and tape recorders) in which these film bases are used generally require great tensile strength, in view of the fact that the film or tape is generally drawn off a supply reel via deflecting rollers and sprockets onto a take-up reel, as well as a uniform thickness throughout the length of the foil to reduce optical and accoustical aberrations, much concern over the tensile strength and uniformity of the foils has been expressed.

One of the methods proposed to produce foils of uniform thickness and high tensile strength has been the electrostatic deposition of a film-forming material upon a smooth surface. In this method, the film former (generally a cellulosic material in a volatile solvent such as acetone) is sprayed as electrostatically charged particles onto an oppositely charged smooth surface. The tensile strength of the resulting foil often depended to a large extent upon the degree of volatilization of the solvent and thus upon its vapor pressure or boiling point since even trace amounts of the solvent trapped in the foil often weakened it considerably. The use of such solvents frequently prevented the formation of extremely thin film, e.g. less than 0.01 mm. in thickness, with the required uniformity.

It is the object of the present invention to provide a method of making thin foils for optical or accoustical recording purposes having a high tensile strength and a uniform thickness.

In accordance with a feature of the invention, a polymerizable substance capable of forming large molecules is electrostatically sprayed onto a smooth surface and polymerized thereon into large molecules. The substance is, advantageously, capable of forming large molecules by two- or three-dimensional cross-linking so as to form the deposited layer in situ into possibly one but more generally a plurality of interleaved molecules extending over considerable areas. The polymerizable substance may be a prepolymerized or partially polymerized material consisting of molecules which are cross-linked upon deposition on the surface, or the monomers of a condensation polymer which is formed only upon deposition. As in my concurrently filed copending application Ser. No. 178,791 which discloses a process for manufacturing color screens, the polymerizable substance preferably contains no or only a minimum amount of a volatile solvent.

According to a more particular feature of the invention, the polymerizable or condensable substance is thermosetting and is exposed to elevated temperatures for curing. Moreover, since the polymeric substance may adhere strongly to the depositing surface, which is preferably formed by a metal, the latter may be heated to effect a release of the polymeric foil. The setting and curing of the layer sprayed onto the surface may be enhanced, according to still another feature of the invention, by the addition of a polymerization catalyst to the substance sprayed onto the surface. The catalyst may be a compound of the type known as a free-radical initiator, i.e. a compound that dissociates into free radicals at a low energy of activation to initiate a free-radical chain polymerization. Most organic peroxides fall into this category.

It is also contemplated, within the scope of the invention, to spray the activator catalyst onto the surface simultaneously with the deposition of the polymerizable substance and/or to spray two different monomers of a so-called block-and-graft polymer, which would normally polymerize upon mixing, onto the surface simultaneously from different nozzles. The polymerizable substance and the activator may, or course, also be sprayed onto the surface successively. When sufficient concentrations of a catalyst are used, aftercuring at elevated temperatures may be dispensed with since the polymer or condensate forms rapidly even at room temperature.

While the invention generally may be carried out with polymeric substances prepared in accordance with any of the examples of the above-mentioned copending application (with, of course, the omission of the organic dyestuff,) I prefer to use a polyester resin capable of cross-linking, such as an unsaturated polyester, which is sprayed onto the surface together with a solvent adapted to condense with the polyester. Thus, styrene or a homologue thereof may be employed as a solvent for the ester and copolymerized therewith with the aid of a peroxide catalyst. The styrene in this case is a monomer of the resulting polymer as well as the solvent for the ester. The polymeric foil may be stripped from the surface with the aid of heat as previously noted.

The above and other objects, features and advantages of the present invention will be more readily apparent from the following description, reference being made to the accompanying drawing the sole figure of which is a diagrammatic elevational view of an apparatus for producing a polymeric foil according to the invention.

In the drawing I show an endless metallic band 10 having a highly polished outer surface 11 upon which the polymeric substance is electrostatically sprayed. The band 10, which may be of stainless or chromium-plated steel, passes over a pair of rollers 12 journalled in supports 13 and driven in the conventional manner. A spray nozzle 14 disposed above the band 10 is negatively charged relatively to the band 10 by a battery 15 whose negative terminal is connected to the nozzle and whose positive terminal is connected to a wiper 16 making electrical contact with the surface 11 of band 10. Thus the particles 17 of polymeric material, which may be prepared in accordance with the following example, upon leaving the nozzle 14 are negatively charged with respect to the surface 11 and form a uniform layer thereon. While the catalyst may be introduced into the polymerizable substance before its discharge through nozzle 14, I prefer, in order to avoid polymerization prior to deposition of the layer 18 on the band 10, to employ another nozzle 19 which is disposed forwardly of nozzle 14 in the direction of band travel (arrow 20). Nozzle 19 is also electrically connected to the negative terminal of battery 15 and is thus negatively charged with respect to the band 10 so that the negatively charge particles 21 of catalyst or activator emanating from nozzle 19 are attracted toward the band whereby they initiate polymerization of the layer 18 of the yet unpolymerized substance. The polymerized layer 22, which may consist of a single macromolecule or a plurality of interleaved macromolecules, then passes beneath a wire brush 23. The latter is electrically connected to the positive terminal of battery 15 and thus discharges the layer with respect to the band. A pair of radiant heating lamps 24, representative of any conventional heating device, are disposed along the band 10 forwardly of brush 23 to cure the layer 22 which is stripped from the band 10 by a blade 25 and coiled at 26. Proximal to blade 25, the band 10 is heated by a pair of resistance-heating elements 26 which facilitate the stripping operation by loosening the bond between the layer and the surface 11. The layer may also be stripped readily from the band if a conventional silicone anti-adhering substance is added to the polymerizable substance.

*Example*

An unsaturated polymerizable polyester suitable for use in accordance with the invention is prepared in the following manner:

2.2 moles of diethylene glycol is reacted with 2.0 moles of maleic anhydride at a temperature of 80° C. under a nitrogen atmosphere for several minutes, whereupon the reaction mixture is brought to a temperature of about 150° C. and maintained at this temperature for about one hour. The mixture is then heated to and maintained at a temperature of 190° C. for about four hours. Volatile products are removed by vacuum distillation (at a pressure of 100 to 200 mm. of mercury) leaving a residue of poly(oxydiethylene maleate). This substance is then dissolved in about 43 parts of styrene for each 100 parts by weight of the maleate polymer, thereby constituting a solution suitable for spraying onto the band 10 through nozzle 14. To each 100 parts of this solution, about 0.7 part by weight of tertiary-butyl peroxide may be added prior to spraying. In like proportion, the peroxide activator or catalyst may be sprayed from nozzle 19 onto the previously deposited layer. The catalyst may also be vaporized and its vapors passed over the polymerizable layer to promote polymerization. The foil is cured at a temperature between substantially 80 and 100° C. in about 15 minutes.

The invention as described and illustrated is believed to admit of manifold modifications and substitutions within the ability of persons skilled in the art and intended to be included within the spirit and scope of the appended claims.

I claim:

1. A process for making a film base, comprising the steps of electrostatically spraying a polymerizable substance onto a smooth surface, polymerizing said substance on said surface to form a polymeric foil, and stripping said foil from said surface.

2. A process according to claim 1 wherein said substance is sprayed onto said surface by subdividing said substance into particles, charging said particles electrostatically with one polarity, charging said surface electrostatically with the opposite polarity, and depositing said particles on said surface.

3. A process according to claim 1 wherein said surface is heated prior to stripping said foil therefrom.

4. A process according to claim 1, further comprising the step of contacting said substance with a polymerization-promoting catalyst.

5. A process according to claim 4 wherein said catalyst is admixed with said substance prior to spraying the latter onto said surface.

6. A process according to claim 4 wherein said catalyst is sprayed onto said substance subsequently to the deposition thereof on said surface.

7. A process according to claim 4 wherein vapors of said catalyst are passed over said substance subsequently to the deposition thereof on said surface.

8. A process according to claim 1 wherein said substance is free from volatile solvent.

9. A process according to claim 8 wherein said substance is admixed with a solvent capable of copolymerizing with said substance upon deposition on said surface.

10. A process according to claim 9 wherein said substance and said solvent form a thermosetting copolymer, further comprising the step of heating said foil prior to stripping it from said surface for curing it.

11. A process according to claim 10 wherein said substance is a synthetic resin capable of cross-linking in at least two dimensions.

12. A process according to claim 11 wherein said substance is an unsaturated polyester and said solvent is styrene monomer.

13. A process according to claim 12, further comprising the step of adding a free-radical-forming polymerization catalyst to said solution.

14. A process according to claim 13 wherein said catalyst is an organic peroxide.

References Cited in the file of this patent

UNITED STATES PATENTS 3,032,815　　Gerber _____ May 8, 1962

FOREIGN PATENTS 147,752　　Australia _____ Aug. 11, 1952